United States Patent
Jin et al.

(10) Patent No.: US 12,441,677 B2
(45) Date of Patent: Oct. 14, 2025

(54) ONE STEP SYNTHESIS FOR ALKYL 2-FLUOROACRYLATES

(71) Applicant: Vifor (International) Ltd., St. Gallen (CH)

(72) Inventors: Qingwu Jin, Bothell, WA (US); Michael Whitacre, San Carlos, CA (US)

(73) Assignee: VIFOR (INTERNATIONAL) LTD., St. Gallen (CH)

( * ) Notice: Subject to any disclaimer, the term of this patent is extended or adjusted under 35 U.S.C. 154(b) by 748 days.

(21) Appl. No.: 17/755,981

(22) PCT Filed: Nov. 12, 2020

(86) PCT No.: PCT/US2020/060112
§ 371 (c)(1),
(2) Date: May 13, 2022

(87) PCT Pub. No.: WO2021/097012
PCT Pub. Date: May 20, 2021

(65) Prior Publication Data
US 2023/0002306 A1    Jan. 5, 2023

Related U.S. Application Data

(60) Provisional application No. 62/935,218, filed on Nov. 14, 2019.

(51) Int. Cl.
C07C 67/32 (2006.01)
C08F 220/22 (2006.01)
C08J 3/09 (2006.01)

(52) U.S. Cl.
CPC ............ C07C 67/32 (2013.01); C08F 220/22 (2013.01); C08J 3/095 (2013.01); C08J 2333/16 (2013.01)

(58) Field of Classification Search
CPC ..... C07C 69/533; C07C 69/65; C07C 69/653; C07C 67/317; C07C 67/32
See application file for complete search history.

(56) References Cited

U.S. PATENT DOCUMENTS

| | | | |
|---|---|---|---|
| 3,262,968 A | 7/1966 | Sedlak et al. | |
| 5,266,668 A | 11/1993 | Heumuller et al. | |
| 10,125,085 B2 | 11/2018 | Von Dem Bruch et al. | |

FOREIGN PATENT DOCUMENTS

| | | |
|---|---|---|
| CA | 1280118 | 2/1991 |
| CN | 86103531 A | 1/1987 |
| CN | 87104092 A | 2/1988 |
| CN | 102202670 A | 9/2011 |
| CN | 102459143 A | 5/2012 |
| CN | 103910628 A | 7/2014 |
| CN | 106458841 A | 2/2017 |
| EP | 0 230 656 A1 | 8/1987 |
| GB | 1115287 | 5/1968 |
| JP | 2014-141477 A | 8/2014 |
| WO | 2010/022381 A1 | 2/2010 |
| WO | 2017/109658 A1 | 6/2017 |

OTHER PUBLICATIONS

Gassen, K.R. et al., Synthesis of a-fluoroacrylic acid and derivatives, Journal of Fluorine Chemistry, vol. 55 (1991), pp. 149-162.
Kitazume, Tomoya et al., One-Pot Synthesis of α-Fluoro-α, α-Unsaturated Esters from Chloromalonic Ester and Carbonyl Compounds Using "Spray-Dried" Potassium Fluoride, Chemstry Letters (1981) pp. 1259-1260.
Xavier, Tania et al., Synthesis of α,β-Disubstituted Acrylates via Galat Reaction, Organic Letters (2019), 21, pp. 6135-6139.

*Primary Examiner* — Kregg T Brooks
(74) *Attorney, Agent, or Firm* — Stinson LLP

(57) ABSTRACT

A process is provided that results in an alkyl haloacrylate that is produced by reaction of a dialkyl or diaryl halomalonate with an aldehyde, preferably formalin or paraformaldehyde, and a base catalyst to produce an intermediate that is not isolated and is heated to produce the alkyl haloacrylate. This synthesis can be one pot, meaning it reacts in the same vessel and/or reaction mixture and does not require isolation of the intermediate, and provides an improved yield. In particular, a process is provided that results in an alkyl 2-fluoroacrylate.

15 Claims, No Drawings

ONE STEP SYNTHESIS FOR ALKYL 2-FLUOROACRYLATES

CROSS-REFERENCE TO RELATED APPLICATIONS

This application is a 35 U.S.C. § 371 application of PCT/US2020/060112, filed on Nov. 12, 2020 which claims the benefit of U.S. Provisional Patent Application Ser. No. 62/935,218, filed on Nov. 14, 2019. The entire contents of the above applications are hereby incorporated by reference.

FIELD OF THE INVENTION

The present invention relates to a one step process for the synthesis of alkyl 2-haloacrylates. The process does not require isolation of an intermediate and provides an improved yield compared to methods used in the art.

BACKGROUND OF THE INVENTION

Alkyl 2-haloacrylates (particularly alkyl 2-fluoroacrylates) can be used as monomers for preparing a variety of polymers. These poly (alkyl 2-haloacrylates) can be used as films, in plastics, and as medicaments.

The literature discloses various processes for preparing alkyl 2-haloacrylates. However, these processes suffer from a number of drawbacks, including low product yield and/or the need to isolate intermediates as well as the use of highly toxic reagents.

A process for the preparation of methyl α-fluoroacrylate comprising admixing dimethyl oxalate with methyl fluoroacetate in the presence of sodium methoxide is described in U.S. Pat. No. 3,262,968 (Example 1). The reported conversion of methyl fluoroacetate was 89%. However, the process used an excess of solvents (greater than 170 parts tetrahydrofuran and 650 parts methylene chloride) and the product mixture contained significant residual methyl fluoroacetate (classified as "extremely hazardous" by the World Health Organization).

A process for preparing 2-fluoroacrylic esters involving the hydrolysis of hydroxymethyl-fluoromalonic esters followed by decarboxylation and re-esterification is described in Gassen et al., J. Fluorine Chemistry, 55, (1991) 149-162. A process for the synthesis of fluoroacrylic acid esters (e.g., methyl α-fluoroacrylate), involving hydroxymethylation of dialkyl malonate with formaldehyde, isolation of an intermediate, acid hydrolysis and further purification is described in CA1280118C. The reported yield was 58%. A process for preparing 2-haloacrylic esters involving the hydroxylmethylation of dialkyl malonate with formaldehyde, isolation of an intermediate, followed by nucleophilic halogenation and decarboxylation is described in WO 2015/193392. The reported yield was less than 70%. The additional processing steps and low yields make these processes undesirable for many applications.

The present description provides a process for the synthesis of alkyl 2-haloacrylates that occurs in the same vessel and/or reaction mixture, does not require the isolation of an intermediate, does not require the use of extremely toxic reagents, reduces synthetic steps, and provides an improved yield compared to methods used in the art.

BRIEF SUMMARY OF THE INVENTION

Disclosed herein is a process for preparing a haloacrylate compound comprising contacting a malonate compound corresponding to the structure of Formula 1

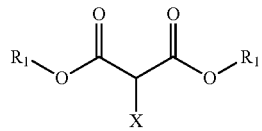

(1)

with an aldehyde to form a reaction mixture, wherein each $R_1$ group is independently alkyl or aryl and X is fluoro, chloro, bromo, or iodo; and heating the reaction mixture in the presence of a base to form a haloacrylate compound corresponding to the structure of Formula 2

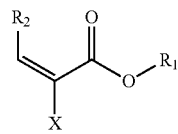

(2)

wherein $R_2$ is hydrogen, alkyl, or aryl, and the overall yield of the compound corresponding to the structure of Formula 2 is at least 75% based on the amount of the compound corresponding to the structure of Formula 1.

Also disclosed herein is a process for preparing a haloacrylate compound comprising contacting a compound corresponding to the structure of Formula 1

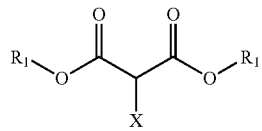

(1)

with an aldehyde to form a reaction mixture, wherein each $R_1$ group is independently alkyl or aryl and X is fluoro, chloro, bromo, or iodo; and heating the reaction mixture in the presence of a base to form a haloacrylate compound corresponding to the structure of Formula 2

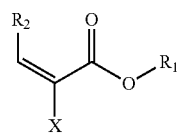

(2)

wherein $R_2$ is hydrogen, alkyl, or aryl, and conversion of the compound corresponding to the structure of Formula 1 to the compound corresponding to the structure of Formula 2 occurs in the same reaction mixture.

Also, disclosed herein is a process for preparing a fluoroacrylate compound comprising contacting a compound corresponding to the structure of Formula 3

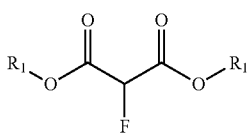

(3)

with a formaldehyde, preferably paraformaldehyde or formalin, to form a reaction mixture, wherein each $R_1$ group is independently alkyl or aryl; and heating the reaction mixture in the presence of a base to form a fluoroacrylate compound corresponding to the structure of Formula 4

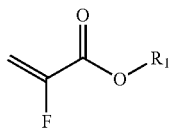

(4)

wherein the overall yield of the compound corresponding to the structure of Formula 4 is at least 75% based on the amount of the compound corresponding to the structure of Formula 3.

Also disclosed herein is a process for preparing a fluoroacrylate compound comprising contacting a compound corresponding to the structure of Formula 3

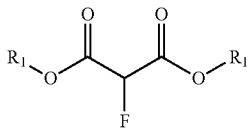

(3)

with a formaldehyde, preferably paraformaldehyde or formalin, to form a reaction mixture, wherein each $R_1$ group is independently alkyl or aryl; and heating the reaction mixture in the presence of a base to form a fluoroacrylate compound corresponding to the structure of Formula 4

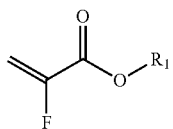

(4)

wherein conversion of the compound corresponding to the structure of Formula 3 to the compound corresponding to the structure of Formula 4 occurs in the same reaction mixture.

Additionally, the disclosure is directed to a process for preparing patiromer calcium sorbitex comprising preparing the fluoroacrylate of Formula 2A by the process described herein; forming a polymerization reaction mixture comprising divinyl benzene, 1,7-octadiene, and the fluoroacrylate of Formula 2A to form crosslinked alkyl(2-fluoroacrylate)-divinylbenzene-1,7-octadiene polymer; deprotecting the crosslinked alkyl(2-fluoroacrylate)-divinylbenzene-1,7-octadiene polymer to form crosslinked (2-fluoroacrylate)-divinylbenzene-1,7-octadiene polymer; contacting the crosslinked (2-fluoroacrylate)-divinylbenzene-1,7-octadiene polymer with a calcium salt to form crosslinked (calcium 2-fluoroacrylate)-divinylbenzene-1,7-octadiene polymer; swelling the crosslinked (calcium 2-fluoroacrylate)-divinylbenzene-1,7-octadiene polymer and contacting with sorbitol to form patiromer calcium sorbitex (i.e., sorbitol-loaded crosslinked (calcium 2-fluoroacrylate)-divinylbenzene-1,7-octadiene polymer).

Other objects and features will be in part apparent and in part pointed out hereinafter.

DETAILED DESCRIPTION OF THE INVENTION

A process is described herein for the preparation of alkyl or aryl haloacrylates in which a dialkyl or diaryl halomalonate is contacted with an aldehyde, preferably, formalin or paraformaldehyde, to form a reaction mixture which is heated, typically in the presence of a base, to form the alkyl or aryl haloacrylate.

For the process described herein, the conversion of a compound corresponding to the structure of Formula 1 to a compound corresponding to the structure of Formula 2, or a compound corresponding to the structure of Formula 3 to a compound corresponding to the structure of Formula 4, occurs in the same reaction mixture. The process does not require isolation of an intermediate. Thus, for a batch process, the conversion of a compound corresponding to the structure of Formula 1 to a compound corresponding to the structure of Formula 2, or the conversion of a compound corresponding to the structure of Formula 3 to a compound corresponding to the structure of Formula 4, occurs in the same reaction mixture, typically in the same vessel. For a continuous process, the conversion of a compound corresponding to the structure of Formula 1 to a compound corresponding to the structure of Formula 2, or a compound corresponding to the structure of Formula 3 to a compound corresponding to the structure of Formula 4, occurs in the same reaction mixture.

The process described herein are more efficient than methods described in the prior art in terms of use of reagents and manufacturing steps because the synthesis can occur in one reaction vessel without transfer or isolation of an intermediate. Further, the product yield is improved over methods described in the prior art for preparing the alkyl 2-haloacrylates.

The production of methyl 2-fluoroacrylate (MFA) from dimethyl fluoromalonate (DMFM) can be accomplished in high yields in a simplified one-pot batch process. A formaldehyde source (e.g., paraformaldehyde and formalin) can be used as reactants with an excess of 10 mol % being sufficient.

A solvent is typically used for this process. Usually, a polar aprotic solvent is used, and typically a high boiling point, polar aprotic solvent. Typical solvents include dimethyl sulfoxide, N-methyl pyrrolidone, and sulfolane; more typically, the solvent is sulfolane.

The concentration of DMFM can be in the range of 10 to 60 wt. %, 20 to 50 wt. %, 30 to 40 wt. %. Typically, the concentration of DMFM is in the range of 35 to 40 wt. %; more typically, the concentration of DMFM is about 37 wt. %.

A base is typically used as a catalyst in this process. Organic bases, such as triethylamine, pyridine, pyrrolidine, morpholine, 1,8-diazabicyclo[5.4.0]undec-7-ene, and (1,4-diazabicyclo[2.2.2]octane, are capable of promoting the reaction. Inorganic bases, such as aluminum oxide, calcium oxide, and potassium carbonate, are also capable of promoting the reaction. Typically, potassium and cesium carbonate were used, with cesium carbonate producing higher yields.

The process starting temperature can range from 10 to 120° C. Dosing the aldehyde reagent to the reaction mixture produces a rapid exotherm. This exotherm is considered to be the condensation reaction leading to an intermediate. Accordingly, the temperature for dosing formaldehyde is controlled below 30° C. After the exotherm, the temperature of the reaction mixture is typically increased and reaction proceeds to form the desired product. This is considered to be a decarboxylation reaction.

The temperature for the reactive distillation (e.g., a decarboxylation and distillation) can range from 60 to 150° C., 70 to 140° C., 80 to 135° C., 90 to 130° C., or 100 to 140° C.; preferably, a temperature of about 110 to 130° C. is used, or about 120° C. Lower temperatures can be used, but may slow down the reaction and produce MFA at low yields.

Pressure for reactive distillation can range from 50 to 1000 mbar, 70 to 750 mbar, 90 to 500 mbar, or 100 to 300 mbar; typically, the pressure is about 200 mbar. At lower pressures, more distillate may be collected at a faster rate; however, more solvent may also be collected.

Overall yields can be 75% or greater, 80% or greater, 85% or greater, 90% or greater, 95% or greater, or 97% or greater, in relation to amounts of a compound corresponding to the structure of Formula 1 (or a compound corresponding to the structure of Formula 3). Overall yields may be up to 75%, up to 80%, up to 85%, up to 90%, up to 95%, or up to 97%, in relation to the amounts of a compound corresponding to the structure of Formula 1 (or a compound corresponding to the structure of Formula 3). Overall yields can range from 75 to 97%, 80 to 95%, 85 to 97%, or 85 to 90%, in relation to the amounts of a compound corresponding to the structure of Formula 1 (or a compound corresponding to the structure of Formula 3). As described herein, crude (unpurified) yields up to 92.7% were achieved, in relation to amounts of a compound corresponding to the structure of Formula 1 (or a compound corresponding to the structure of Formula 3).

Additionally, disclosed herein is a process for preparing a haloacrylate compound comprising contacting a compound corresponding to the structure of Formula 1 with an aldehyde, preferably paraformaldehyde or formalin, to form a reaction mixture comprising the aldehyde and a compound corresponding to the structure of Formula 1

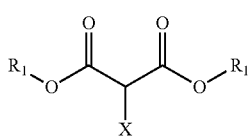
(1)

wherein each $R_1$ group is independently alkyl and X is fluoro, chloro, bromo, or iodo; and heating the reaction mixture in the presence of a base to form a haloacrylate compound corresponding to the structure of Formula 2

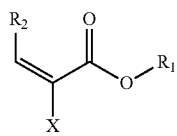
(2)

wherein $R_2$ is hydrogen, alkyl, or aryl, and either (i) the overall yield of the compound corresponding to the structure of Formula 2 is at least 75% based on the amount of the compound corresponding to the structure of Formula 1 or (ii) conversion of the compound corresponding to the structure of Formula 1 to the compound corresponding to the structure of Formula 2 occurs in the same reaction mixture.

Usually in the process described herein with respect to compounds of Formulae 1 and 2, the aldehyde is paraformaldehyde or formalin and $R_2$ is hydrogen.

More typically, in the process described herein with respect to compounds of Formulae 1 and 2, the aldehyde is paraformaldehyde or formalin, $R_2$ is hydrogen, and X is fluorine.

Disclosed herein is a process for preparing a fluoroacrylate compound comprising contacting a compound corresponding to the structure of Formula 1A with paraformaldehyde or formalin to form a reaction mixture of paraformaldehyde or formalin and a compound corresponding to the structure of Formula 1A

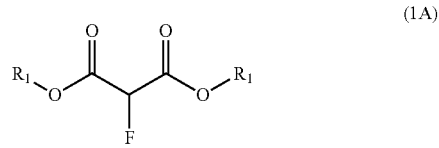
(1A)

wherein each $R_1$ group is independently alkyl or aryl; and heating the reaction mixture in the presence of a base to form a fluoroacrylate compound corresponding to the structure of Formula 2A

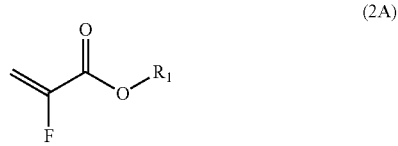
(2A)

wherein the overall yield of the compound corresponding to the structure of Formula 2A is at least 75% based on the amount of the compound corresponding to the structure of Formula 1A.

Also disclosed herein is a process for preparing a fluoroacrylate compound comprising contacting a compound corresponding to the structure of Formula 1A with paraformaldehyde or formalin to form a reaction mixture of the aldehyde and a compound corresponding to the structure of Formula 1A

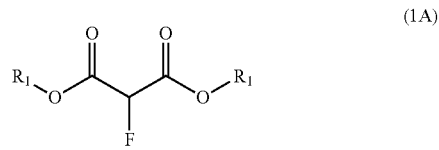
(1A)

wherein each $R_1$ group is independently alkyl; and heating the reaction mixture in the presence of a base to form a fluoroacrylate compound corresponding to the structure of Formula 2A

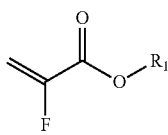

(2A)

wherein conversion of the compound corresponding to the structure of Formula 1A to the compound corresponding to the structure of Formula 2A occurs in the same reaction mixture.

Usually in the process for preparing the haloacrylate of Formula 2 or the fluoroacrylate of Formula 2A, the reaction mixture comprises paraformaldehyde or formalin.

Typically in the process described herein for preparing a compound corresponding to the structure of Formula 2 or 2A, the overall yield of the compound is at least 75%, 80%, 85%, or 90% based on the amount (number of moles or equivalents) of the compound corresponding to the structure of Formula 1 or 1A.

In the process described herein for preparing a compound corresponding to the structure of Formulae 1, 1A, 2, and 2A, $R_1$ can be $C_1$-$C_6$ alkyl. Typically, $R_1$ is methyl, ethyl, or propyl, and more typically, $R_1$ is methyl.

The base used in the process can comprise an organic nitrogen base, an alkaline earth metal hydroxide, an alkali metal hydroxide, an alkaline earth metal carbonate, an alkali metal carbonate, an alkaline earth metal hydrogen carbonate, an alkali metal hydrogen carbonate, or a combination thereof.

The base can comprise aluminum oxide, calcium oxide, barium oxide, triethylamine, pyridine, pyrrolidine, morpholine, lutidine, collidine, picoline, trimethylamine, tripropylamine, tributylamine, dimethylethylamine, dimethylpropylamine, dimethylbutylamine, diethylmethylamine, diethylpropylamine, diethylbutylamine, N,N-diisopropylmethylamine, N,N-diisopropylethylamine, N-ethyldiisopropylamine, N,N-dimethylethylamine, N,N-diethylbutylamine, 1,2-dimethylpropylamine, N,N-diethylmethylamine, N,N-dimethylisopropylamine, 1,3-dimethylbutylamine, 3,3-dimethylbutylamine, N,N-dimethylbutylamine, 1,8-diazabicyclo[5.4.0]undec-7-ene, 1,4-diazabicyclo[2.2.2]octane, lithium hydroxide, sodium hydroxide, potassium hydroxiderubidium hydroxide, cesium hydroxide, calcium hydroxide, strontium hydroxide, barium hydroxide, lithium carbonate, sodium carbonate, potassium carbonate, rubidium carbonate, cesium carbonate, magnesium carbonate, calcium carbonate, strontium carbonate, barium carbonate, lithium hydrogen carbonate, sodium hydrogen carbonate, potassium hydrogen carbonate, rubidium hydrogen carbonate, cesium hydrogen carbonate, magnesium hydrogen carbonate, calcium hydrogen carbonate, strontium hydrogen carbonate, barium hydrogen carbonate, or a combination thereof; preferably, the base comprises lithium carbonate, sodium carbonate, potassium carbonate, rubidium carbonate, cesium carbonate, magnesium carbonate, calcium carbonate, strontium carbonate, barium carbonate, or a combination thereof; more preferably, the base comprises potassium carbonate, cesium carbonate, or a combination thereof. Typically, the base comprises cesium carbonate.

The reaction mixture can be heated to a temperature of at least about 110° C., from about 110° C. to about 170° C., from about 110° C. to about 160° C., from about 110° C. to about 150° C., from about 110° C. to about 140° C., from about 110° C. to about 130° C., from about 115° C. to about 170° C., from about 115° C. to about 160° C., from about 115° C. to about 150° C., from about 115° C. to about 140° C., from about 115° C. to about 130° C., or from about 115° C. to about 125° C.

The reaction mixture can be heated to reflux.

The reaction mixture can be heated for at least about 30 minutes, from about 30 minutes to about 120 minutes, from about 30 minutes to about 105 minutes, from about 30 minutes to about 90 minutes, from about 30 minutes to about 75 minutes, from about 30 minutes to about 60 minutes, from about 45 minutes to about 120 minutes, from about 45 minutes to about 105 minutes, from about 45 minutes to about 90 minutes, from about 45 minutes to about 75 minutes, from about 45 minutes to about 60 minutes, or from about 50 minutes to about 70 minutes.

The process disclosed herein can have the reaction mixture comprise one equivalent of the compound corresponding to the structure of Formula 1 or 1A and greater than one equivalent paraformaldehyde. Preferably, the reaction mixture comprises from about 1.1 to about 3, from about 1.1 to about 2.5, from about 1.1 to about 2, from about 1.1 to about 1.7, from about 1.1 to about 1.5, or from about 1.1 to about 1.3 equivalents of paraformaldehyde.

The reaction mixture can comprise from about 0.05 to about 0.5 mole equivalent of base, from about 0.05 to about 0.4 mole equivalent of base, from about 0.05 to about 0.3 mole equivalent of base, from about 0.05 to about 0.2 mole equivalent of base, from about 0.05 to about 0.15 mole equivalent of base, from about 0.1 to about 0.5 mole equivalent of base, from about 0.1 to about 0.4 mole equivalent of base, from about 0.1 to about 0.3 mole equivalent of base, from about 0.1 to about 0.2 mole equivalent of base, from about 0.1 to about 0.15 mole equivalent of base, or about 0.1 mole equivalent of base, based on the amount (number of moles) of the compound corresponding to the structure of Formula 1 or 1A.

The reaction mixture can further comprise a solvent.

The solvent can comprise a polar aprotic solvent.

The solvent can comprise dimethyl sulfoxide, dimethyl formamide, dimethyl acetamide, ethylene glycol, polyethylene glycol, polypropylene glycol, ethylene glycol dimethyl ether, tetraethylene glycol dimethyl ether, quinoline, tetrahydroquinoline, N-methyl pyrrolidone, dimethyl imidazolidinone, sulfolane, glyme, diglyme, or a combination thereof. Typically, the solvent comprises dimethyl sulfoxide, N-methyl pyrrolidone, sulfolane, or a combination thereof, and more typically, the solvent comprises sulfolane.

The concentration of the compound corresponding to the structure of Formula 1 or 1A in the reaction mixture can be from about 2 wt. % to about 50 wt. %, from about 5 wt. % to about 50 wt. %, from about 10 wt. % to about 50 wt. %, from about 15 wt. % to about 50 wt. %, from about 20 wt. % to about 50 wt. %, from about 25 wt. % to about 50 wt. %, from about 30 wt. % to about 50 wt. %, from about 35 wt. % to about 50 wt. %, from about 2 wt. % to about 45 wt. %, from about 5 wt. % to about 45 wt. %, from about 10 wt. % to about 45 wt. %, from about 15 wt. % to about 45 wt. %, from about 20 wt. % to about 45 wt. %, from about 25 wt. % to about 45 wt. %, from about 30 wt. % to about 45 wt. %, from about 35 wt. % to about 45 wt. %, from about 2 wt. % to about 40 wt. %, from about 5 wt. % to about 40 wt. %, from about 10 wt. % to about 40 wt. %, from about 15 wt. % to about 40 wt. %, from about 20 wt. % to about 40 wt. %, from about 25 wt. % to about 40 wt. %, from about 30 wt. % to about 40 wt. %, or from about 35 wt. % to about 40 wt. %.

The pressure of the reaction mixture can be from about 50 mbar (5 kPa) to about 1000 mbar (100 kPa), from about 50 mbar (5 kPa) to about 800 mbar (80 kPa), from about 50 mbar (5 kPa) to about 600 mbar (60 kPa), from about 50 mbar (5 kPa) to about 400 mbar (40 kPa), from about 50 mbar (5 kPa) to about 300 mbar (30 kPa), from about 100 mbar (10 kPa) to about 1000 mbar (100 kPa), from about 100 mbar (10 kPa) to about 800 mbar (80 kPa), from about 100 mbar (10 kPa) to about 600 mbar (60 kPa), from about 100 mbar (10 kPa) to about 400 mbar (40 kPa), or from about 100 mbar (10 kPa) to about 300 mbar (30 kPa); preferably, from about 100 mbar (10 kPa) to about 300 mbar (30 kPa). Typically, the pressure of the reaction mixture can be 200 mbar (20 kPa).

The compound corresponding to the structure of Formula 2 can be prepared according to the following synthetic scheme, wherein $R_1$, $R_2$ and X are defined above.

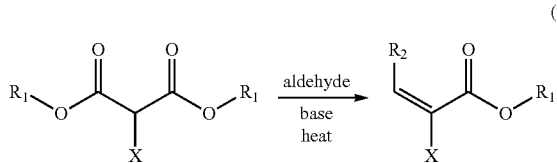

Dimethyl fluoromalonate is available commercially from Oakwood Chemical Products, Inc. of Estill, S.C. Diethyl fluoromalonate is available commercially from Sigma-Aldrich, St. Louis, Missouri.

Additionally, the disclosure includes a process for preparing patiromer calcium sorbitex comprising preparing the fluoroacrylate of Formula 2A by the process described herein; forming a polymerization reaction mixture comprising divinyl benzene, 1,7-octadiene, and the fluoroacrylate of Formula 2A to form crosslinked alkyl(2-fluoroacrylate)-divinylbenzene-1,7-octadiene polymer; deprotecting the crosslinked alkyl(2-fluoroacrylate)-divinylbenzene-1,7-octadiene polymer to form crosslinked (2-fluoroacrylate)-divinylbenzene-1,7-octadiene polymer; contacting the crosslinked (2-fluoroacrylate)-divinylbenzene-1,7-octadiene polymer with a calcium salt to form crosslinked (calcium 2-fluoroacrylate)-divinylbenzene-1,7-octadiene polymer; swelling the crosslinked (calcium 2-fluoroacrylate)-divinylbenzene-1,7-octadiene polymer and contacting with sorbitol to form patiromer calcium sorbitex.

The polymerization reaction mixture comprises divinyl benzene, 1,7-octadiene, the fluoroacrylate of Formula 2A, and a polymerization initiator.

The polymerization initiator comprises lauroyl peroxide.

The process described herein includes deprotecting the crosslinked alkyl(2-fluoroacrylate)-divinylbenzene-1,7-octadiene polymer to form crosslinked (2-fluoroacrylate)-divinylbenzene-1,7-octadiene polymer comprises hydrolyzing the crosslinked alkyl(2-fluoroacrylate)-divinylbenzene-1,7-octadiene polymer.

The process includes hydrolyzing the crosslinked alkyl (2-fluoroacrylate)-divinylbenzene-1,7-octadiene polymer comprises contacting the crosslinked alkyl(2-fluoroacrylate)-divinylbenzene-1,7-octadiene polymer with a strong base.

The strong base is an aqueous strong base.

The aqueous strong base comprises sodium hydroxide, potassium hydroxide, rubidium hydroxide, cesium hydroxide, or a combination thereof; preferably, the aqueous strong base comprises sodium hydroxide.

When the strong base of sodium hydroxide is used, the process includes the (2-fluoroacrylate)-divinylbenzene-1,7-octadiene polymer being formed is crosslinked (sodium 2-fluoroacrylate)-divinylbenzene-1,7-octadiene polymer.

The process includes contacting the crosslinked (2-fluoroacrylate)-divinylbenzene-1,7-octadiene polymer with the calcium salt to form crosslinked (calcium 2-fluoroacrylate)-divinylbenzene-1,7-octadiene polymer comprising slurrying the crosslinked (2-fluoroacrylate)-divinylbenzene-1,7-octadiene polymer with the calcium salt.

The process also includes contacting the crosslinked (2-fluoroacrylate)-divinylbenzene-1,7-octadiene polymer with the calcium salt to form crosslinked (calcium 2-fluoroacrylate)-divinylbenzene-1,7-octadiene polymer comprising slurrying the crosslinked (sodium 2-fluoroacrylate)-divinylbenzene-1,7-octadiene polymer with the calcium salt.

The calcium salt comprises calcium chloride, calcium bromide, calcium iodide, or a combination thereof.

The process further includes swelling the crosslinked (calcium 2-fluoroacrylate)-divinylbenzene-1,7-octadiene polymer by slurrying the polymer in a solution comprising sorbitol.

The solution comprising sorbitol is an aqueous sorbitol solution.

The crosslinked cation exchange polymer (e.g., patiromer calcium sorbitex) can be synthesized by preparing an organic phase and an aqueous phase. The organic phase typically contains a polymerization initiator, a fluoroacrylate of Formula 2A, 1,7-octadiene, and divinyl benzene. The aqueous phase generally contains a polymerization suspension stabilizer, a water soluble salt, water, and optionally a buffer. The organic phase and the aqueous phase are then combined and stirred under nitrogen. The mixture is generally heated to about 60° C. to about 80° C. for about 2.5 to about 3.5 hours, allowed to rise up to 95° C. after polymerization is initiated, and then cooled to room temperature. After cooling, the aqueous phase is removed. Water is added to the mixture, the mixture is stirred, and the resulting solid is filtered. The solid is washed with water, alcohol, or alcohol/water mixtures.

As described above, polymerization suspension stabilizers, such as polyvinyl alcohol, are used to prevent coalescence of particles during the polymerization process. Further, it has been observed that the addition of sodium chloride in the aqueous phase decreases coalescence and particle aggregation. Other suitable salts for this purpose include salts that are soluble in the aqueous phase. Water soluble salts can be added at a concentration of from about 0.1 wt. % to about 10 wt. %, particularly from about 2 wt. % to about 5 wt. %, and even more particularly from about 3 wt. % to about 4 wt. %.

Preferably, an organic phase of methyl 2-fluoroacrylate (90 wt. %), 1,7-octadiene (5 wt. %) and divinylbenzene (5 wt. %) is prepared and 0.5 wt. % of lauroyl peroxide is added to initiate the polymerization reaction. Additionally, an aqueous phase of water, polyvinyl alcohol, phosphates, sodium chloride, and sodium nitrite is prepared. Under nitrogen and while keeping the temperature below about 30° C., the aqueous and organic phases are mixed together. Once mixed completely, the reaction mixture is gradually heated with continuous stirring. After the polymerization reaction is initiated, the temperature of the reaction mixture is allowed to rise up to about 95° C. Once the polymerization reaction is complete, the reaction mixture is cooled to room temperature and the aqueous phase is removed. The solid can be isolated by filtration once water is added to the mixture. The filtered solid is washed with water and then with a methanol/ water mixture. The resulting product is a crosslinked (methyl 2-fluoroacrylate)-divinylbenzene-1,7-octadiene terpolymer.

As discussed herein, after polymerization, the product may be hydrolyzed or otherwise deprotected by methods known in the art. For hydrolysis of the polymer having ester groups to form a polymer having carboxylic acid groups, preferably, the polymer is hydrolyzed with a strong base (e.g., sodium hydroxide, potassium hydroxide, magnesium hydroxide, or calcium hydroxide) to remove the alkyl (e.g., methyl) group and form the carboxylate salt. Alternatively, the polymer can be hydrolyzed with a strong acid (e.g., hydrochloric acid) to form the carboxylate salt. Preferably, the (methyl 2-fluoroacrylate)-divinylbenzene-1,7-octadiene terpolymer is hydrolyzed with an excess of aqueous sodium hydroxide solution at a temperature from about 30° C. to about 100° C. to yield (sodium 2-fluoroacrylate)-divinylbenzene-1,7-octadiene terpolymer. Typically, the hydrolysis reaction is carried out for about 15 to 25 hours. After hydrolysis, the solid is filtered and washed with water and/or an alcohol.

The cation of the polymer salt formed in the hydrolysis reaction or other deprotection step depends on the base used in that step. For example, when sodium hydroxide is used as the base, the sodium salt of the polymer is formed. This sodium ion can be exchanged for another cation by contacting the sodium salt with an excess of an aqueous metal salt to yield an insoluble solid of the desired polymer salt. After the desired ion exchange, the product is washed with an alcohol and/or water and dried directly or dried after a dewatering treatment with denatured alcohol; preferably, the product is washed with water and dried directly. For example, the sodium salt of the cation exchange polymer is converted to the calcium salt by washing with a solution that substitutes calcium for sodium, for example, by using calcium chloride, calcium acetate, calcium lactate gluconate, or a combination thereof. And, more specifically, to exchange sodium ions for calcium ions, the (sodium 2-fluoroacrylate)-divinylbenzene-1,7-octadiene terpolymer is contacted with an excess of aqueous calcium chloride to yield an insoluble solid of crosslinked (calcium 2-fluoroacrylate)-divinylbenzene-1,7-octadiene terpolymer.

Using this suspension polymerization process, crosslinked polyMeFA polymer is isolated in good yield, generally above about 85%, more specifically above about 90%, and even more specifically above about 93%. The yield of the second step (i.e., hydrolysis) preferably occurs in 100%, providing an overall yield above about 85%, more specifically above about 90%, and even more specifically above about 93%.

To add sorbitol to the sorbitol stabilized compositions, the salt of the polymer is swelled and contacted with a solution of sorbitol (e.g., slurried with an aqueous solution of sorbitol), typically with the slurry containing an excess amount of sorbitol based on polymer weight. The slurry is maintained for at least 3 hours and ambient temperature and pressure. The solids are then filtered off and dried to desired moisture content.

Unless otherwise indicated, an alkyl group as described herein alone or as part of another group is an optionally substituted linear saturated monovalent hydrocarbon radical containing from one to twenty carbon atoms and preferably one to eight carbon atoms, or an optionally substituted branched saturated monovalent hydrocarbon radical containing three to twenty carbon atoms, and preferably three to eight carbon atoms. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The term "aryl" as used herein alone or as part of another group denotes an optionally substituted monovalent aromatic hydrocarbon radical, preferably a monovalent monocyclic or bicyclic group containing from 6 to 12 carbons in the ring portion, such as phenyl, biphenyl, naphthyl, substituted phenyl, substituted biphenyl or substituted naphthyl. Phenyl and substituted phenyl are the more preferred aryl groups. The term "aryl" also includes heteroaryl.

The term "substituted" as in "substituted aryl," "substituted alkyl," and the like, means that in the group in question (i.e., the alkyl, aryl or other group that follows the term), at least one hydrogen atom bound to a carbon atom is replaced with one or more substituent groups such as hydroxy (—OH), alkylthio, phosphino, amido (—CON($R_A$)($R_B$), wherein $R_A$ and $R_B$ are independently hydrogen, alkyl, or aryl), amino(—N($R_A$)($R_B$), wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—OC(O)$R_A$ wherein $R_A$ is alkyl or aryl), keto (—C(O)$R_A$ wherein $R_A$ is alkyl or aryl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

Having described the invention in detail, it will be apparent that modifications and variations are possible without departing from the scope of the invention defined in the appended claims.

EXAMPLES

The following non-limiting examples are provided to further illustrate the present invention.

Example 1: Synthesis of Methyl 2-Fluoroacrylate

The formation of MFA from DMFM was accomplished in a reactive distillation system. The process was exothermic and kinetically rapid. Several process parameters were optimized, such as specific reactants, catalysts and solvents, and their respective concentrations; as well as temperature and pressure. The scale of the experiments was up to 100 g. Table 1 provides a summary of the conditions examined.

Reactive distillation of DMFM to MFA was conducted in jacketed 500 mL reactor with mechanical agitation. Boiling products were condensed via a condenser and collected in a 3-neck round-bottom flask attached to the reactor. Pressure was controlled by a vacuum pump. Temperature was controlled by a circulator and an internal thermocouple. DMFM, solvent, catalyst, and stabilizer were added to the reactor and allowed to reach desired temperature. Paraformaldehyde or formalin was then dosed into the reactor. After dosing the paraformaldehyde or formalin, the temperature was increased to 120° C. and the pressure was decreased to 200 mbar (20 kPa). When liquid was no longer condensing (about 1 hour), the system was cooled and vacuum released.

Sulfolane (125 g), DMFM (100 g), phenothiazine (1.37 g), and cesium carbonate (21.7 g) were charged into a jacketed reactor with mechanical stirring set to 250 rpm. Paraformaldehyde (22 g) was dosed to the reaction mixture. After the exotherm finished, the reactor jacket temperature was ramped to 120° C. and vacuum was applied slowly to 200 mbar (20 kPa). The temperature and pressure were held at the set points, while the decarboxylation reaction proceeded. Product was collected via a condenser (at −20° C.) into a round bottom flask in a dry ice and acetone bath. Once distillate was no longer being collected (about 1 hour), the temperature was cooled to 30° C. and the vacuum released. Distillate was analyzed with GC-MS and GC-FID for identification and quantification, respectively. The receiver flask contained 81.6 g total, 64.3 g of which was quantified as MFA, resulting in a distillate of 79% pure MFA and a crude yield of 92.7% (Table 1 Condition #20).

The distillate comprised of the reaction products, methanol and MFA, and minor amounts of solvent. Crude product identification and quantitation was accomplished by GC-MS and GC-FID, respectively. Acetonitrile was utilized as a diluent for analyses. Only three significant signals were detected in the crude product: MeOH (32 g/mol), MFA (104.1 g/mol), and solvent. NMR further confirmed the product identities. Quantification of theoretical yield was achieved through a 5-point GC-FID calibration curve for each identified component.

Characterization: HNMR, GC-MS, b.p.
Boiling point: 91° C. at 1 bar
MS: m/z Calculated for $C_4H_5FO_2$: 104.1, found [M]+ 104.1
$^1$H NMR (500 MHz, $CDCl_3$), δ 5.69 (1H, dd, JH-F=43.25), 5.3 (1H, dd, J=13), 3.854 (3H, s).

the change in the formaldehyde source. Therefore, the added water and methanol in formalin did not seem to affect reaction kinetics and yield (Example #1). However, water in the reaction system caused a two-phase partition in the distillate receiver resulting in a loss of MFA from the organic phase to the methanol rich aqueous phase. The addition of the formaldehyde source led to a rapid exotherm. When formaldehyde was charged all at once, the reaction temperature increased quickly from 25° C. to about 60° C. For paraformaldehyde, no benefit was noticed from increasing the amount of formaldehyde in the system from 10% to 70% excess, as seen in Example #7 and 12.

Base Catalyst

Base catalysts such as potassium and cesium carbonate demonstrated high yields. Cesium carbonate at a molar ratio of 0.1 was found to be most effective (Example #21). Reducing the molar equivalence to 0.05 caused a minor decrease in yield, as shown in Example #10. Example #12 showed the increase in molar equivalence of catalyst did not improve the overall reaction yield. Potassium carbonate produced slightly lower yields relative to cesium carbonate; this may be due to the increased solubility of cesium carbonate in aprotic polar solvents (Example #17).

Solvent

The most effective solvents for the synthesis were polar aprotic solvents with high boiling points, e.g., N-methyl-2-

TABLE 1

Experimentation summary for the one-pot batch process to produce MFA from DMFM

| Condition # | Notebook number | Scale Mass (g) | DM FM Mol Eq | Reactant Name | Mol Eq | Catalyst Name | Mol Eq | Solvent Name | Mass Eq | Stabilizer Mass (g) | [DM-FM] wt % | Temperature ° C. | Pressure mbar | % Yield[1] % |
|---|---|---|---|---|---|---|---|---|---|---|---|---|---|---|
| 1 | 0404-60 | 5 | 1 | FA | 1.1 | $Cs_2CO_3$ | 0.1 | NMP | 1.5 | 0.01 | 34.3 | 120 | 200 | 76 |
| 2 | 0404-49 | | | PFA | | $Cs_2CO_3$ | | NMP | 20 | | 4.6 | 60 | 1000 | <20% |
| 3 | 0404-64 | | | PFA | | $K_2CO_3$ | | NMP | 20 | | 4.7 | 60 | 1000 | 17 |
| 4 | 0377-70 | 20 | | PFA | | $K_2CO_3$ | | NMP | 1 | | 43.3 | 130 | 50 | 79.4 |
| 5 | 0377-60 | | | PFA | | $K_2CO_3$ | | NMP | 2 | | 30.2 | 130 | 50 | 73.5 |
| 6 | 0377-56 | | | PFA | | $K_2CO_3$ | | DMSO | 1 | | 43.3 | 130 | 50 | 62.4 |
| 7 | 0377-93 | | | PFA | 1.7 | $Cs_2CO_3$ | | Sulfolane | | | 35.7 | 130 | 200 | 78.3 |
| 8 | 0377-85-2 | | | PFA | 1.1 | $Cs_2CO_3$ | | NMP | | | 41.1 | 130 | 200 | 78.8 |
| 9 | 0377-85-1 | | | PFA | | $Cs_2CO_3$ | | NMP | | | 41.1 | 130 | 100 | 76.6 |
| 10 | 0377-94-1 | | | PFA | | $Cs_2CO_3$ | 0.05 | Sulfolane | | | 38.8 | 130 | 200 | 78.2 |
| 11 | 0377-94-2 | | | PFA | | $Cs_2CO_3$ | 0.1 | Sulfolane | | | 37.2 | 130 | 200 | 82.8 |
| 12 | 0377-72 | | | PFA | 1.5 | $K_2CO_3$ | 0.4 | NMP | | | 36.9 | 130 | 50 | 72.8 |
| 13 | 0377-90 | | | PFA | 1.1 | $Cs_2CO_3$ | 0.1 | Sulfolane | | | 41.1 | 130 | 800 | 36.4 |
| 14 | 0377-84-2 | | | PFA | | $Cs_2CO_3$ | | NMP | | | 41.1 | 130 | 50 | 76.9 |
| 15 | 0377-83-2 | | | PFA | | $Cs_2CO_3$ | | NMP | | | 41.1 | 150 | 50 | a |
| 16 | 0404-17 | 50 | | PFA | | $Cs_2CO_3$ | | Sulfolane | | | 35.1 | 70 | 200 | <20% |
| 17 | 0404-13 | 100 | | PFA | | $K_2CO_3$ | | Sulfolane | | | 38.3 | 120 | 200 | b |
| 18 | 0404-18 | | | PFA | | $Cs_2CO_3$ | | Sulfolane | | | 37.2 | 120 | 200 | 87.1 |
| 19 | 0404-19 | | | PFA | | $Cs_2CO_3$ | | Sulfolane | | | 37.2 | 120 | 200 | 89.6 |
| 20 | 0404-20 | | | PFA | | $Cs_2CO_3$ | | Sulfolane | | | 37.2 | 120 | 200 | 92.0 |
| 21 | 0404-21 | | | PFA | | $Cs_2CO_3$ | | Sulfolane | | | 37.2 | 120 | 200 | 92.7 |
| 22 | 0404-22 | | | PFA | | $Cs_2CO_3$ | | Sulfolane | | | 37.2 | 120 | 200 | 85.4 |
| 23 | 0404-23 | | | PFA | | $Cs_2CO_3$ | | Sulfolane | | | 37.2 | 120 | 200 | 87.3 |
| 24 | 0404-25 | | | PFA | | $Cs_2CO_3$ | | Sulfolane | | 0 | 37.2 | 120 | 200 | 83.7 |

[1]Yield refers to the amount of MFA collected in the distillate pot compared to the theoretical amount possible from DMFM. The distillate pot includes methanol, MFA, and solvent. MFA was quantified using GC-FID with a 5-point calibration curve. PFA refers to paraformaldehyde, while FA represents formalin.
a Good yield (~76%). More solvent was detected in the distillate pot. NMP accounted for 23a%, while in Example ##14 NMP was 5a%
b Good yield (~85%). Not quantified because the mass collected was consistent with Example #18.

From Table 1, it can be seen that condition numbers 18 to 23 resulted in the best conversion.

Aldehyde Reactant

Formalin (i.e., 37 wt. % aqueous formaldehyde) and paraformaldehyde were both successful as formaldehyde sources and each generated good yield. Examples #1 and 9 show when equivalent ratios of reactants and reaction conditions are used, the yield of MFA is not greatly affected by pyrrolidone (NMP), sulfolane, and dimethyl sulfoxide (DMSO). Polarity of the solvents helped increase the solubility of the carbonate catalyst and high boiling points reduced the amount of solvent collected in the distillate receiver. As shown in Table 1, sulfolane was the most effective solvent in terms of yield (Example #21). Additionally, sulfolane produced the purest distillate, likely due to the large boiling point difference between the solvent and the product. The solvent, NMP, produced good yields of MFA when the DMFM concentration was 43 wt. % (Example #4). When the concentration of DMFM was decreased to 30 wt. %, the yield dropped slightly (Example #5). The experiment using DMSO as solvent was produced a lower yield of MFA than when NMP or sulfolane was used as the solvent (Example #6).

Temperature

Decarboxylation took place in a temperature range of 60 to 150° C. Since the decarboxylation reaction required heat, at lower temperature (e.g., less than 70° C.) very little conversion was observed (Examples #2, 3, 16), while the best yields were obtained at 120° C. (Examples #18-24). If the reaction temperature reached 150° C. (Example #15), it is possible that side reactions occurred, including MFA self-polymerization, and more solvent was collected during distillation (Example #15).

Pressure

While the temperature was increased for decarboxylation, the pressure was reduced to remove $CO_2$ and distill the products. During the optimization, the reaction pressure was varied from 50 mbar to atmospheric pressure (1 bar). From the data presented in the table, it appears that the system pressure had little or no affect the decarboxylation kinetics, but it did affect the amount of product that distilled from the reaction mixture. Higher yields were obtained with pressures of about 200 mbar (Examples #18-24). The more the pressure decreased, the more solvent was detected in the distillate (Examples #14 and 15). At higher pressure, 800 mbar (80 kPa), the yield fell significantly as shown in Example #13.

Example 2: Patiromer Calcium Sorbitex (i.e., Sorbitol-loaded, Crosslinked (calcium 2-fluoroacrylate)-divinylbenzene-1,7-octadiene copolymer)

Methyl 2-fluoroacrylate (MeFA) is prepared as above in Example 1. Divinylbenzene (DVB) is purchased from Aldrich, technical grade, 80%, mixture of isomers, and is used as received. 1,7-octadiene (ODE), lauroyl peroxide (LPO), polyvinyl alcohol (PVA) (typical molecular weight 85,000-146,000, 87-89% hydrolyzed), sodium chloride (NaCl), sodium phosphate dibasic heptahydrate ($Na_2HPO_4 \cdot 7H_2O$) and sodium phosphate monobasic monohydrate ($NaH_2PO_4 \cdot H_2O$) are purchased from commercial sources and used as received.

In an appropriately sized reactor with appropriate stirring and other equipment, a 90:5:5 weight ratio mixture of organic phase of monomers is prepared by mixing methyl 2-fluoroacrylate, 1,7-octadiene, and divinylbenzene. One-half part of lauroyl peroxide is added as an initiator of the polymerization reaction. A stabilizing aqueous phase is prepared from water, polyvinyl alcohol, phosphates, sodium chloride, and sodium nitrite. The aqueous and monomer phases are mixed together under nitrogen at atmospheric pressure, while maintaining the temperature below 30° C. The reaction mixture is gradually heated while stirring continuously. Once the polymerization reaction has started, the temperature of the reaction mixture is allowed to rise to a maximum of 95° C.

After completion of the polymerization reaction, the reaction mixture is cooled and the aqueous phase is removed. Water is added, the mixture is stirred, and the solid material is isolated by filtration. The solid is then washed with water to yield a crosslinked (methyl 2-fluoroacrylate)-divinylbenzene-1,7-octadiene copolymer. The crosslinked (methyl 2-fluoroacrylate)-divinylbenzene-1,7-octadiene copolymer is hydrolyzed with an excess of aqueous sodium hydroxide solution at 90° C. for 24 hours to yield crosslinked (sodium 2-fluoroacrylate)-divinylbenzene-1,7-octadiene copolymer. After hydrolysis, the solid is filtered and washed with water. The crosslinked (sodium 2-fluoroacrylate)-divinylbenzene-1,7-octadiene copolymer is exposed at room temperature to an excess of aqueous calcium chloride solution to yield insoluble cross-linked (calcium 2-fluoroacrylate)-divinylbenzene-1,7-octadiene copolymer.

After the calcium ion exchange, the wet polymer is slurried with 25-30% w/w aqueous solution of sorbitol at ambient temperature to yield sorbitol-loaded polymer. Excess sorbitol is removed by filtration. The resulting polymer is dried at 20-30° C. until the desired moisture content (10-25 w/w/%) is reached. This provided a solid patiromer calcium sorbitex (i.e., sorbitol-loaded, crosslinked (calcium 2-fluoroacrylate)-divinylbenzene-1,7-octadiene copolymer).

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and process without departing from the scope of the invention, it is intended that all matter contained in the above description and shown in the accompanying drawings shall be interpreted as illustrative and not in a limiting sense.

The invention claimed is:

1. A process for preparing a fluoroacrylate compound comprising:

contacting a compound corresponding to the structure of Formula 1A with paraformaldehyde or formalin to form a reaction mixture of paraformaldehyde or formalin and a compound corresponding to the structure of Formula 1A

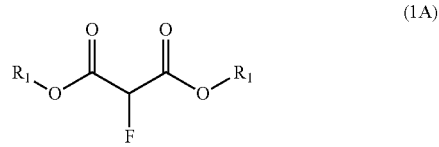

(1A)

wherein each $R_1$ group is independently alkyl or aryl; and heating the reaction mixture in the presence of a base to form a fluoroacrylate compound corresponding to the structure of Formula 2A

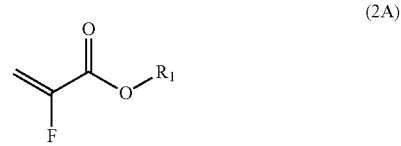

(2A)

wherein conversion of the compound corresponding to the structure of Formula 1A to the compound corresponding to the structure of Formula 2A occurs in the same reaction mixture or wherein the overall yield of the compound corresponding to the structure of Formula 2A is at least 75% based on the number of moles of the compound corresponding to the structure of Formula 1A; and wherein the base comprises lithium carbonate, sodium carbonate, potassium carbonate, rubidium carbonate, cesium carbonate, magnesium carbonate, calcium carbonate, strontium carbonate, barium carbonate, or a combination thereof.

2. The process of claim 1, wherein the overall yield of the compound corresponding to the structure of Formula 2 is at least 90% based on the number of moles of the compound corresponding to the structure of Formula 1.

3. The process of claim 1, wherein $R_1$ is methyl, ethyl, or propyl.

4. The process of claim 1, wherein the base comprises cesium carbonate.

5. The process of claim 4, wherein the reaction mixture is heated to a temperature of from about 110° C. to about 170° C.

6. The process of claim 5, wherein the reaction mixture is heated for at least about 30 minutes.

7. The process of claim 1, wherein the reaction mixture comprises one equivalent of the compound corresponding to the structure of Formula 1 or 1A and from about 1.1 to about 3 equivalents of paraformaldehyde.

8. The process of claim 1, wherein the reaction mixture further comprises a solvent and the solvent comprises dimethyl sulfoxide, dimethyl formamide, dimethyl acetamide, ethylene glycol, polyethylene glycol, polypropylene glycol, ethylene glycol dimethyl ether, tetraethylene glycol dimethyl ether, quinoline, tetrahydroquinoline, N-methyl pyrrolidone, dimethyl imidazolidinone, sulfolane, glyme, diglyme, or a combination thereof.

9. The process of claim 8, wherein the solvent comprises sulfolane.

10. A process for preparing patiromer calcium sorbitex comprising
preparing the fluoroacrylate of Formula 2A by the process of claim 1;
forming a polymerization reaction mixture comprising divinyl benzene, 1,7-octadiene, and the fluoroacrylate of Formula 2A to form crosslinked alkyl(2-fluoroacrylate)-divinylbenzene-1,7-octadiene polymer;
deprotecting the crosslinked alkyl(2-fluoroacrylate)-divinylbenzene-1,7-octadiene polymer to form crosslinked (2-fluoroacrylate)-divinylbenzene-1,7-octadiene polymer;
contacting the crosslinked (2-fluoroacrylate)-divinylbenzene-1,7-octadiene polymer with a calcium salt to form crosslinked (calcium 2-fluoroacrylate)-divinylbenzene-1,7-octadiene polymer;
swelling the crosslinked (calcium 2-fluoroacrylate)-divinylbenzene-1,7-octadiene polymer and contacting with sorbitol to form patiromer calcium sorbitex.

11. The process of claim 10, wherein the polymerization reaction mixture comprises divinyl benzene, 1,7-octadiene, the fluoroacrylate of Formula 2A, and a polymerization initiator.

12. The process of claim 11, wherein deprotecting the crosslinked alkyl(2-fluoroacrylate)-divinylbenzene-1,7-octadiene polymer to form crosslinked (2-fluoroacrylate)-divinylbenzene-1,7-octadiene polymer comprises hydrolyzing the crosslinked alkyl(2-fluoroacrylate)-divinylbenzene-1,7-octadiene polymer by contacting the crosslinked alkyl(2-fluoroacrylate)-divinylbenzene-1,7-octadiene polymer with a strong base.

13. The process of claim 12, wherein contacting the crosslinked (2-fluoroacrylate)-divinylbenzene-1,7-octadiene polymer with the calcium salt to form crosslinked (calcium 2-fluoroacrylate)-divinylbenzene-1,7-octadiene polymer comprises slurrying the crosslinked (2-fluoroacrylate)-divinylbenzene-1,7-octadiene polymer with the calcium salt.

14. The process of claim 13, wherein contacting the crosslinked (2-fluoroacrylate)-divinylbenzene-1,7-octadiene polymer with the calcium salt to form crosslinked (calcium 2-fluoroacrylate)-divinylbenzene-1,7-octadiene polymer comprises slurrying the crosslinked (sodium 2-fluoroacrylate)-divinylbenzene-1,7-octadiene polymer with the calcium salt.

15. The process of claim 14, wherein the swelling of the crosslinked (calcium 2-fluoroacrylate)-divinylbenzene-1,7-octadiene polymer comprises slurrying the polymer in a solution comprising sorbitol.

* * * * *